(12) United States Patent
Walker et al.

(10) Patent No.: US 6,504,659 B2
(45) Date of Patent: Jan. 7, 2003

(54) SLIPFACE LENS

(75) Inventors: Christopher I. Walker, Pasadena, CA (US); Roman C. Gutierrez, La Crescenta, CA (US)

(73) Assignee: SiWave, Inc., Arcadia, CA (US)

( * ) Notice: Subject to any disclaimer, the term of this patent is extended or adjusted under 35 U.S.C. 154(b) by 22 days.

(21) Appl. No.: 09/862,358

(22) Filed: May 22, 2001

(65) Prior Publication Data

US 2002/0176179 A1 Nov. 28, 2002

(51) Int. Cl.[7] .................................................. G02B 9/00
(52) U.S. Cl. ........................................ 359/796; 359/754
(58) Field of Search .................................. 359/796, 754

(56) References Cited

U.S. PATENT DOCUMENTS 5,973,853 A * 10/1999 Gaebe et al. ................ 359/796

* cited by examiner

*Primary Examiner*—Hung Xuan Dang
(74) *Attorney, Agent, or Firm*—MacPherson Kwok Chen & Heid LLP

(57) ABSTRACT

An optical lens has a first plano-convex lens and a second plano-convex lens, with the planar sides of the two lenses opposite one another and the optical axes of the two lenses offset from one another. The offset allows a non-vertical light beam to enter and exit the lens at a 90° angle with respect to the two convex surfaces of the lens.

20 Claims, 2 Drawing Sheets

SLIPFACE LENS

FIELD OF THE INVENTION

The present invention relates to optical lenses, and more specifically, to such lenses that focus or collimate angled light entering the lens.

BACKGROUND OF THE INVENTION

Currently, lenses of various types are used to collimate a diverging light beam exiting an optical waveguide and to focus light that is launched into an optical waveguide so as to more efficiently couple the light. However, a frequent concern in the optics field is the ability to focus and/or collimate light that does not enter a lens perpendicular to the plane of the lens. For example, light exiting an optic fiber may strike a bi-convex lens at non-perpendicular angle (e.g., 12°) with respect to the plane normal to the lens surface. In this case, the path of each light ray is different through the lens, resulting in a combination of aberrations including coma. Coma is one of the primary wave aberrations, characterized by an increasing size of the pattern with the off-axis distance of the object point.

FIG. 1 shows a centrosymmetric lens 10 formed from two plano-convex lenses 12 and 14. A light beam, e.g., coming from an optic fiber, is incident on lens 12 at a non-perpendicular angle to the surface of the lens. As a result, the path of each light ray is changed as the light passes through lens 12. The path of each light ray is further changed as it exits lens 14 since the angle is not perpendicular to the surface of lens 14. Since each ray traverses a path through the lens with a different optical length, the wavefront of the light beam exiting the lens is aberrated. In other words, the phase of the light is not constant across the beam. As a result, the beam exiting the lens distorts as it propagates through free-space. Consequently, when these lenses are used to couple light from one fiber to another, fiber coupling efficiency is reduced. The problem worsens as the angle relative to the lens axis increases. One solution to this problem is to tilt lens 10 such that the light enters the lens at a 90° angle (or perpendicular) to the surface of lens 12. As a result, little or no off-axis aberrations are introduced, and the beam is properly collimated and focused by lens 10. However, tilting lens 10 requires careful and precise alignment. Further, lens 10 is typically part of a large array, which makes the alignment even less practical.

Accordingly, an optical lens is desired that can focus and/or collimate light that does not enter the lens at 90° without the disadvantages discussed above.

SUMMARY OF THE INVENTION

According to one aspect of the present invention, a centrosymmetric optical lens is formed from two plano-convex lenses, with the planar surfaces facing each other and offset. The first plano-convex lens (i.e., the lens into which light enters) is shifted in the x-y plane so that the light enters the lens at a 90° angle relative to the incident convex surface of the first lens. The second plano-convex lens (i.e., the lens from which the light exits) is shifted in the x-y plane so that the light exits the lens at a 90° relative to the incident convex surface of the second lens. The result of offsetting the lens halves is that the light beam behaves the same way as if it were entering and exiting a bi-convex lens, which does not induce offaxis aberrations into the exiting beam.

In one embodiment of the invention, the two lens halves are bonded together, such as with an index-matching epoxy or by heating and fusing them together. According to other embodiments, the two lens halves are separated by a spacer, such as silicon, or by an air gap.

In accordance with another aspect of the invention, the first lens has a convex surface, while the second lens has a concave surface which is offset from the first lens. This offset meniscus lens can be formed with the convex surface having a higher radius of curvature (a positive meniscus lens) or a smaller radius of curvature (a negative meniscus lens). Other embodiments utilize a prism lens as the second lens. The prism lens is positioned or formed such that the light beam is incident to the surface of the prism lens at a 90° angle to the surface.

Lenses and lens arrays of the present invention are easily fabricated with existing techniques without introducing off-axis aberrations, are smaller in size than arrays with similar exit diameter beams, can tolerate air gaps, and can easily handle different and large angles of incident light.

The present invention will be more fully understood when taken in light of the following detailed description taken together with the accompanying drawings.

BRIEF DESCRIPTION OF THE DRAWINGS

Use of the same or similar reference numbers in different figures indicates same or like elements.

DESCRIPTION OF THE PREFERRED EMBODIMENTS

According to the present invention, a lens is formed using a first lens (incident to the entering light beam) with a first surface perpendicular to the entering light beam and a second lens with a surface perpendicular to the light entering incident to its surface. By moving the lenses relative to each other and/or forming the lens surfaces accordingly, the first lens does not introduce any off-axis aberrations (wavefront distortions) into the entering light beam, and the second lens does not introduce any off-axis aberrations into the exiting light beam. Accordingly, lenses and arrays of the present invention can collimate and/or focus light at various angles without any off-axis aberrations.

Figure 1:
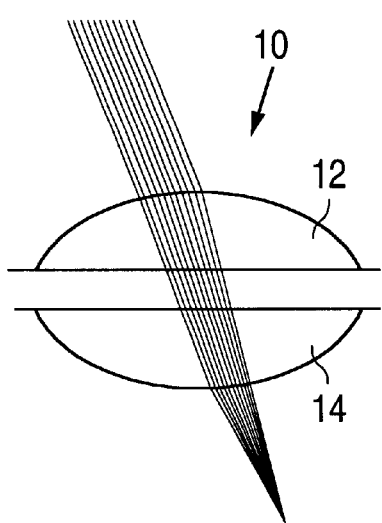
FIG. 1 is a side view of a conventional lens.
Figure 2:
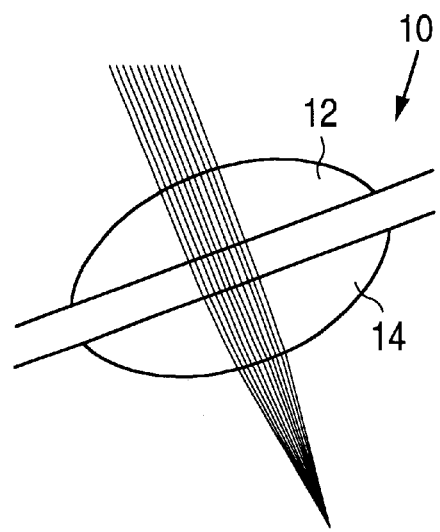
FIG. 2 is a side view of the conventional lens of FIG. 1 tilted.
Figure 3:
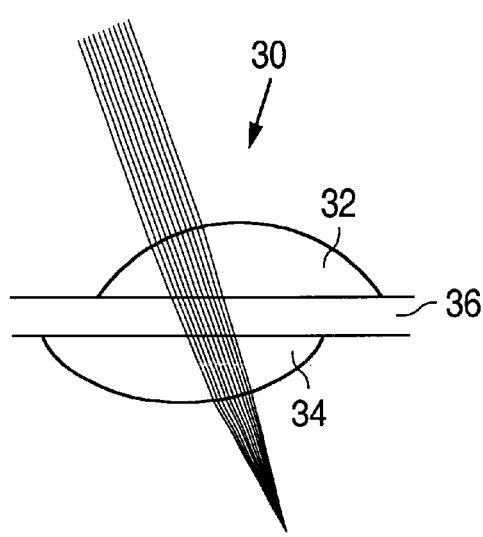
FIG. 3 is a side view of a lens formed from two offset plano-convex lenses according to one embodiment of the present invention.

FIG. 3 is a side view of a lens 30 according to one embodiment of the invention. Lens 30 is formed from a first plano-convex lens 32 and a second plano-convex lens 34. The planar surfaces of lenses 32 and 34 are facing each, with a spacer 36 separating lenses 32 and 34. Spacer 36 can be the same material or have the same index of refraction as lenses 32 and 34, in which case there is no change of path of the light beam. However, spacer 36 can also be made of a different kind of material or have a different index of refraction.

First plano-convex lens 32 is positioned such that an incident light beam (or the primary ray) enters the lens at a 90° angle to the convex surface of the lens. As a result, no off-axis aberrations are introduced into the light beam as it passes through lens 32. In effect, plano-convex lens 32 acts as a spherical lens, but at a much smaller physical size, or as a tilted bi-convex lens. The light beam travels through lens 32 and spacer 36 to the convex surface of lens 34. Second plano-convex lens 34 is positioned such that the light beam (or the primary ray) exits the surface of the lens at a 90° angle to convex surface of the lens. Thus, the optical axis (the axis symmetric in the z-plane) of lens 32 does not coincide with the optical axis of lens 34. It should be noted that the relative offset of positioning of lenses 32 and 34 will depend on many factors, such as, but not limited to the angle of the light entering lens 32, the index of refraction of lenses 32 and 34 and spacer 36, the radius of curvature of lenses 32 and 34, and the wavelength of the light. In some embodiments, spacer 36 is not needed, and lens 32 and 34 are bonded directly to each other, such as by an epoxy having an index of refraction that matches with lenses 32 and 34 or by heating and fusing the planar surfaces together. Because lenses 32 and 34 are offset, this type of lens will also be referred to as a slip-face lens.

Practically, lens 30 is part of a large lens array. The array can be formed by mounting a first array of lenses 32 to a second array of lenses 34, such as through spacer 36. The first and second array of lenses are formed using standard commercially available arrays, such as molded glass lens arrays, diamond turned lens arrays, or etched glass lens arrays using ion milling, reactive ion etching (RIE), or laser etching. Lens arrays can also be formed with procedures disclosed in commonly-owned U.S. Appl. Ser. No. 09/845,894, entitled "Lens Arrays and Methods of Making the Lens Array", filed Apr. 30, 2001, and bearing Ser. No. 09/845,894, which is incorporated by reference in its entirety. The first and second arrays are mounted together with an accuracy of approximately 1 micron or better. In other words, the lateral or x-y positioning of the two arrays is accurate to within approximately 1 micron or less. The surfaces of the lenses, especially the planar surfaces, are coated with conventional anti-reflective materials to minimize the number of ghost beams as well as insertion loss.

Thus, by positioning the first and second arrays to a desired offset, angled light can be collimated and/or focused without the introduction of off-axis aberrations caused by light entering or exiting a lens at non-perpendicular angles. Further because each lens does not have to be tilted, as with prior arrays, the entire lens array can lay flat against a fiber array, thereby decreasing the complexity and size.

Figure 4:
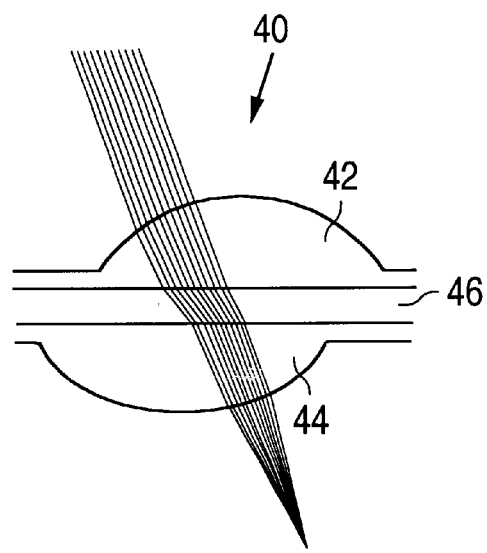
FIG. 4 is a side view of a lens formed from two offset plano-convex lenses with an air gap separating the two lenses.

FIG. 4 shows a slipface lens 40 according to another embodiment of the present invention. Slipface lens 40 includes a first plano-convex lens 42 and a second plano-convex lens 44, with the planar surfaces facing each and separated by an air gap 46. As seen from FIG. 4, the light beam is deflected as it passes between the lens-to-air gap interface of lens 42 and again as it passes between the air gap-to-lens interface of lens 44. Air gap 46 should be approximately 100 microns or less.

Figure 5:
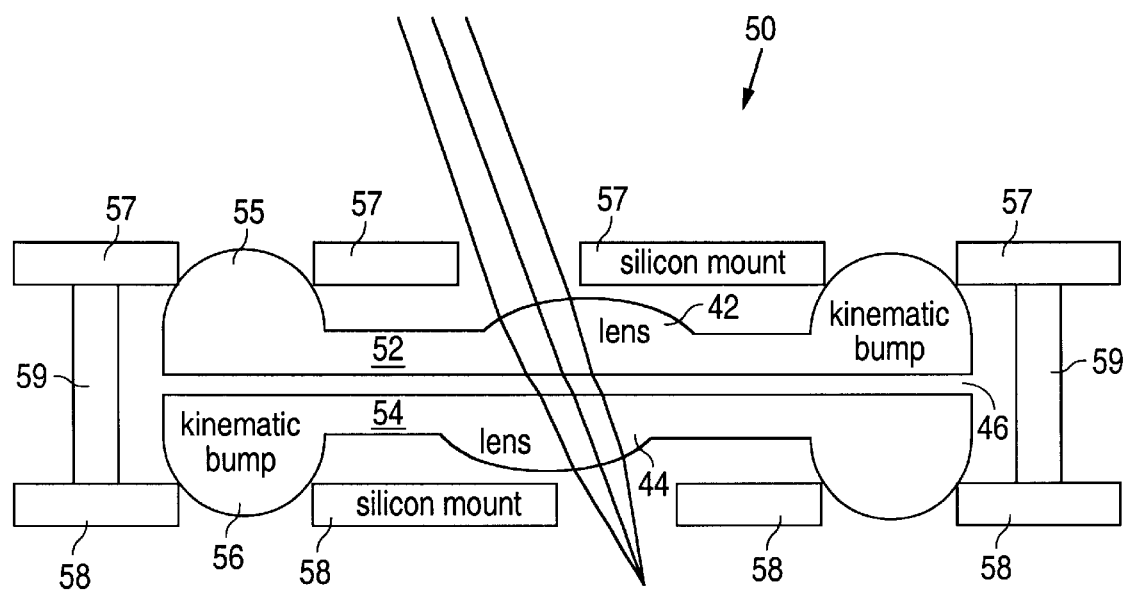
FIG. 5 is a side view of a lens assembly for the lens of FIG. 4.

FIG. 5 shows a lens assembly 50 with lens 40 of FIG. 4. Lens 40 is formed from two molded glass lens arrays 52 and 54. Glass array 52 includes first plano-convex lens 42, along with kinematic bumps 55. Glass array 54 includes second plano-convex lens 44, along with kinematic bumps 56. Kinematic bumps 55 and 56 are secured to respective substrate wafers 57 and 58, typically made of silicon. Kinematic bumps 55 and 56 allow precise positioning of lens 42 and 44, respectively, with respect to each other. The size of air gap 46 is determined by the height of spacer 59, which is secured to wafers 57 and 58.

Figure 6:
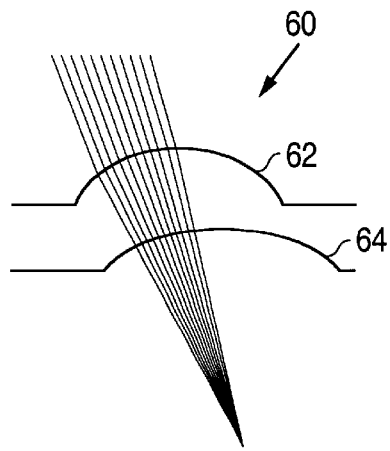
FIG. 6 is a side view of an offset meniscus lens according to another embodiment of the invention.

FIG. 6 shows a slipface lens 60 according to another embodiment, where lens 60 is a meniscus-type lens. Lens 60 has a convex surface 62 and a concave surface 64, which increases the diameter of the light beam exiting the lens. As with previous embodiments, convex surface 62 and concave surface 64 are offset such that the incident light beam impinges each respective surface at a 90° angle. FIG. 6 shows that convex surface 62 has a larger radius of curvature than convex surface 64; however, it should be noted that the radius of curvature can be the same or smaller.

Figure 7:
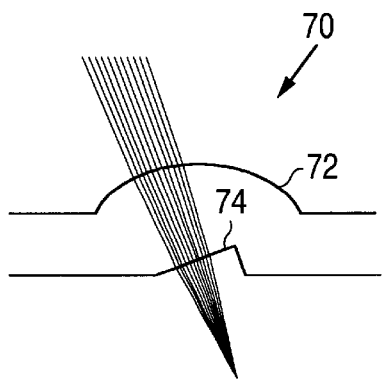
FIG. 7 is a side view of a lens with a convex surface and a prism surface according to yet another embodiment of the present invention.

FIG. 7 shows a slipface lens 70 according to yet another embodiment of the present invention. Lens 70 has a convex surface 72 and a flat angled surface 74. As with other embodiments, convex surface 72 is offset to allow the incident light beam to enter at a 90° angle. Flat angled surface 74 is positioned and/or formed (with an appropriate angle) such that the light beam traveling through lens 70 exits surface 74 at a 90° angle to the surface. This is equivalent to a tilted plano-convex lens.

Figure 8:
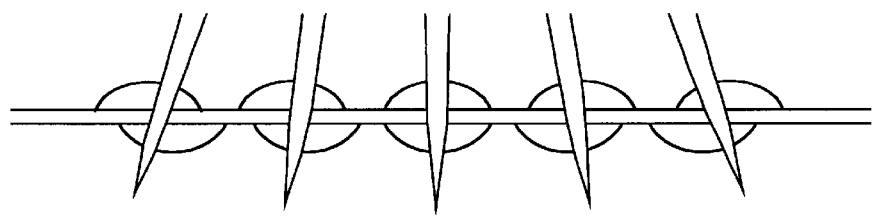
FIG. 8 is a side view of an array of lenses of FIG. 3 with different offsets for incident light at different angles of entry.

The common effect of the present invention is that angled light can be collimated and/or focused without the introduction of off-axis aberrations attributed to light hitting a lens surface at non-perpendicular angles. An array of these lenses can also collimate light from a variety of angles, such as shown in FIG. 8, by providing greater offsets or larger radius of curvature. In addition, the index of refraction of the two lens arrays can be made different in order to compensate for chromatic aberration.

The above-described embodiments of the present invention are merely meant to be illustrative and not limiting. It will thus be obvious to those skilled in the art that various changes and modifications may be made without departing from this invention in its broader aspects. For example, the specification describes parallel light rays entering a lens and being focused to a point. However, the lens of the present invention can also be used to collimate light, i.e., divergent light rays enter the lens, and the lens collimates the divergent light rays into parallel rays. Therefore, the appended claims encompass all such changes and modifications as fall within the true spirit and scope of this invention.

We claim:

1. An optical lens, comprising:
   a first optical surface having a first optical axis, wherein light enters the lens through the first optical surface; and
   a second optical surface having a second optical axis, wherein the light exits the lens through the second optical surface, and wherein the first optical axis and the second optical axis are offset from each other.

2. The optical lens of claim 1, wherein the first optical surface is convex.

3. The optical lens of claim 2, wherein the second optical surface is concave.

4. The optical lens of claim 3, wherein the radius of curvature of the first optical surface is different than the radius of curvature of the second optical surface.

5. The optical lens of claim 1, wherein the first and second optical surfaces are part of a unitary structure.

6. The optical lens of claim 1, wherein the first optical surface is part of a first structure and the second optical surface is part of a second structure.

7. The optical lens of claim 6, wherein the first structure comprises a first planar surface and the second structure comprises a second planar surface, and wherein the first and second planar surfaces face each other.

8. The optical lens of claim 7, further comprising a spacer located between the first and second planar surfaces.

9. The optical lens of claim 7, wherein an air gap separates the first and second planar surfaces.

10. The optical lens of claim 9, wherein the air gap is approximately 10 microns or less.

11. The optical lens of claim 1, wherein the offset is such that the primary ray of the light enters the first optical surface at approximately 90° with respect to the first optical surface and exits the second optical surface at approximately 90° with respect to the second optical surface.

12. An optical lens for collimating or focusing non-vertical light, comprising:
    a first optical surface, wherein the primary ray of the non-vertical light is incident on the first optical surface at approximately 90° with respect to the first optical surface; and
    a second optical surface having an angled planar portion, wherein the primary ray of the non-vertical light is incident on the angled planar portion at approximately 90° with respect to the angled planar portion.

13. The optical lens of claim 12, wherein the non-vertical light enters the first optical surface and exits the second optical surface.

14. The optical lens of claim 13, wherein the first optical surface is convex.

15. A method of forming an optical lens, comprising:
    positioning a first lens portion such that the primary ray of a light beam enters the surface of the first lens portion at approximately 90° with respect to the surface of the first lens portion; and
    positioning a second lens portion such that the primary ray of the light beam exits the surface of the second lens portion at approximately 90° with respect to the second surface of the second lens portion, wherein the optical axes of the first and second lens portions do not coincide.

16. The method of claim 15, wherein the surface of the first lens portion is convex and the surface of the second lens portion is concave.

17. The method of claim 15, further comprising placing a spacer between the first and second lens portions.

18. The method of claim 15, wherein the first lens portion has a first planar surface and the second lens portion has a second planar surface, and further comprising positioning the first and second planar surfaces opposite each other.

19. The method of claim 18, further comprising leaving an air gap between the first and second planar surface.

20. A method of forming an optical lens, comprising:
    providing a first plano-convex lens;
    providing a second plano-convex lens; and
    positioning the first and second plano-convex lenses such that the planar sides of the first and second plano-convex lenses opposite one another and the optical axes of the first and second plano-convex lenses do not coincide.

* * * * *